United States Patent
Bosnyak et al.

(10) Patent No.: US 6,384,642 B1
(45) Date of Patent: May 7, 2002

(54) SWITCHED POSITIVE FEEDBACK FOR CONTROLLED RECEIVER IMPEDANCE

(75) Inventors: Robert J. Bosnyak, San Jose; José M. Cruz; Robert J. Drost, both of Palo Alto, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/680,572

(22) Filed: Oct. 6, 2000

(51) Int. Cl.[7] .............................................. H03B 1/00
(52) U.S. Cl. ..................... 327/108; 327/112; 327/170
(58) Field of Search ................................. 327/108, 112, 327/263, 264, 379, 391, 170; 326/21, 27, 30, 86, 87

(56) References Cited

U.S. PATENT DOCUMENTS 5,751,184 A * 5/1998 Shou et al. ................. 327/552
5,796,313 A * 8/1998 Eitan ............................ 331/57
6,081,165 A * 6/2000 Goldman ...................... 331/57
6,222,791 B1 * 4/2001 Beacker et al. ............. 365/233

* cited by examiner

*Primary Examiner*—Matthew Smith
*Assistant Examiner*—Paul Dinh
(74) *Attorney, Agent, or Firm*—Townsend and Townsend and Crew LLP

(57) ABSTRACT

In an input receiver circuit includes a signal input for receiving a signal input to a chip, a chip output for supplying a buffered signal to circuitry on the chip and a positive feedback circuit coupled between the chip output and the signal input. The positive feedback circuit might comprise a first inverter having an input coupled to the signal input, a second inverter having an input coupled to an output of the first inverter, wherein an output of the second inverter provides the chip output, and an inverting buffer having an input coupled to the output of the second inverter and an output coupled to the signal input.

7 Claims, 4 Drawing Sheets

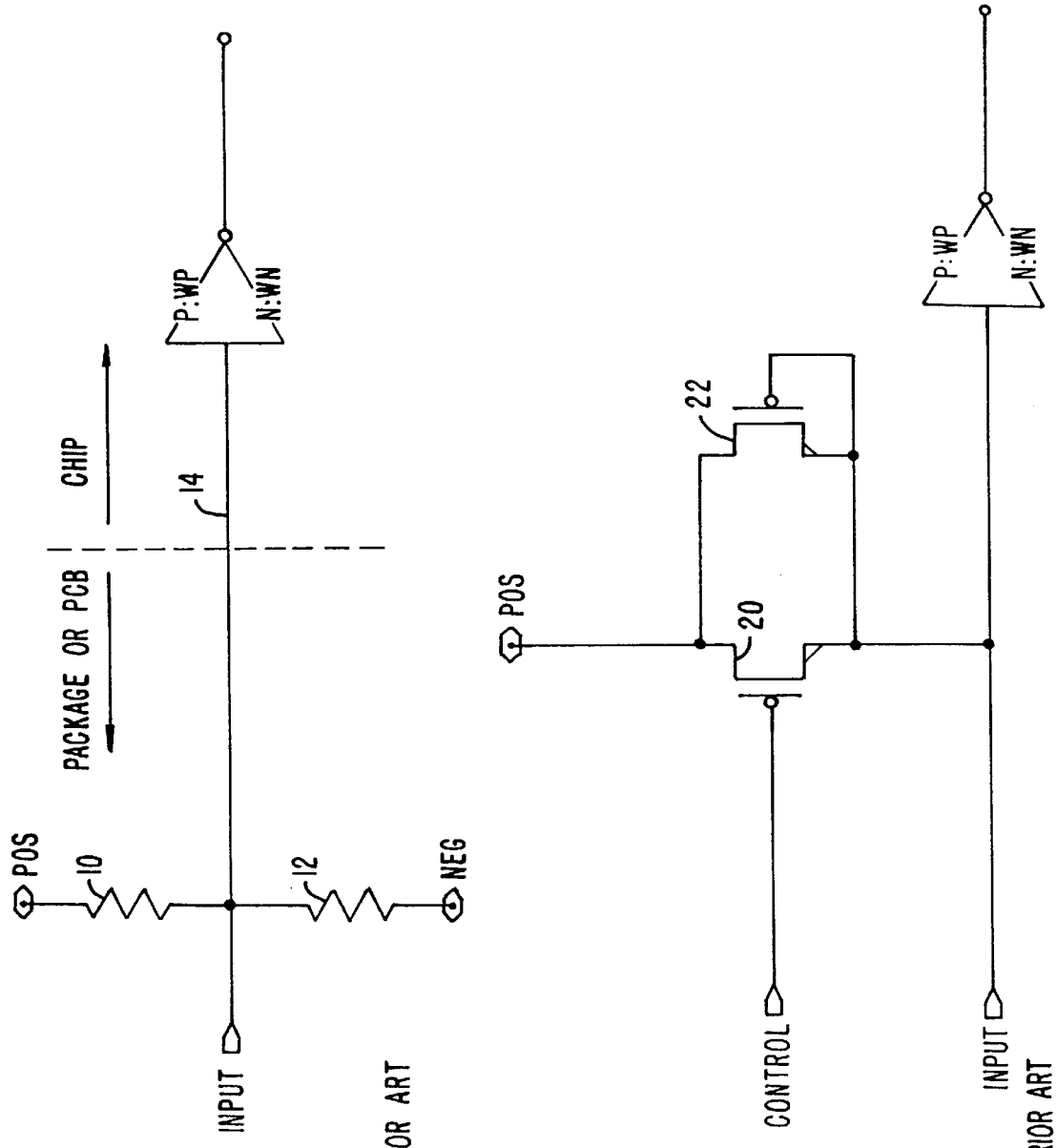

SWITCHED POSITIVE FEEDBACK FOR CONTROLLED RECEIVER IMPEDANCE

FIELD OF INVENTION

The present invention relates to signal receivers at inputs of integrated circuits for receiving high-frequency signals thereon. More specifically, the present invention relates to improvements in matching impedances.

BACKGROUND OF THE INVENTION

Impedance matching is the process of matching impedances between a driver and a receiver. At high frequencies, having matched impedances is important to reduce the amount of signal reflection that occurs at the receiver.

As signal rates increase in integrated circuits (chips), suitably matching impedances between a driver and receivers becomes more problematic. The ideal driver/receiver combination would be a Thevenin equivalent source pulse generator with the output impedance of the driver matching the transmission line impedance ($Z_0$) of the line between the driver and the receiver and matching the input impedance of the receiver.

One solution to input impedance matching is shown in FIG. 1. This solution is often used with CMOS technology chips and where impedance matching is critical to obtaining maximum data transfer rates. As shown in FIG. 1, external resistors 10, 12 are used to match the input impedance of input 14 to the chip. Those external resistors 10, 12 can be discrete resistors added to the printed circuit board on which the chip is to be mounted, or the resistors might be fabricated into the package that supports the chip and makes the electrical connections of the chip available to the traces of the printed circuit board. Either of those solutions works well, but requires additional effort and expense to separately mount those extra components and may decrease the reliability of the circuit due to added connections on the printed circuit board. An additional complexity is introduced by the fact that the resistive components are separate and subject to poor thermal control.

Thus, controlling receiver input resistance at the chip level would benefit chip-to-chip communications. FIG. 2 illustrates one on-chip solution to controlling receiver input resistance. There, two PMOS elements 20, 22 are coupled in parallel such that the parallel resistance of those PMOS elements is at the proper value as set by a control input. An analogous NMOS circuit might also be used. In this approach, the transistors are used to mimic a linear termination but faster response is sometimes needed.

SUMMARY OF THE INVENTION

In an input receiver circuit according to one embodiment of the present invention, the circuit includes a signal input for receiving a signal input to a chip, a chip output for supplying a buffered signal to circuitry on the chip and a positive feedback circuit coupled between the chip output and the signal input. In one embodiment, the positive feedback circuit comprises a first inverter having an input coupled to the signal input, a second inverter having an input coupled to an output of the first inverter, wherein an output of the second inverter provides the chip output, and an inverting buffer having an input coupled to the output of the second inverter and an output coupled to the signal input.

One advantage of such an input receiver circuit is that it provides preemphasis to open up the "eye" in a sampling graph, and it does so without increasing latency.

BRIEF DESCRIPTION OF THE DRAWINGS

FIG. 1 is a schematic diagram of one prior art approach to impedance matching, using external resistors to match the input impedance at a chip input.

FIG. 2 is a schematic diagram of another prior art approach to impedance matching, using controlled MOS transistors are the input impedance.

DESCRIPTION OF THE SPECIFIC EMBODIMENTS

In the figures, like elements are labeled with like numbers and different instances of like elements are labeled with like numbers and different parenthetical numbers or letters.

Figure 3:
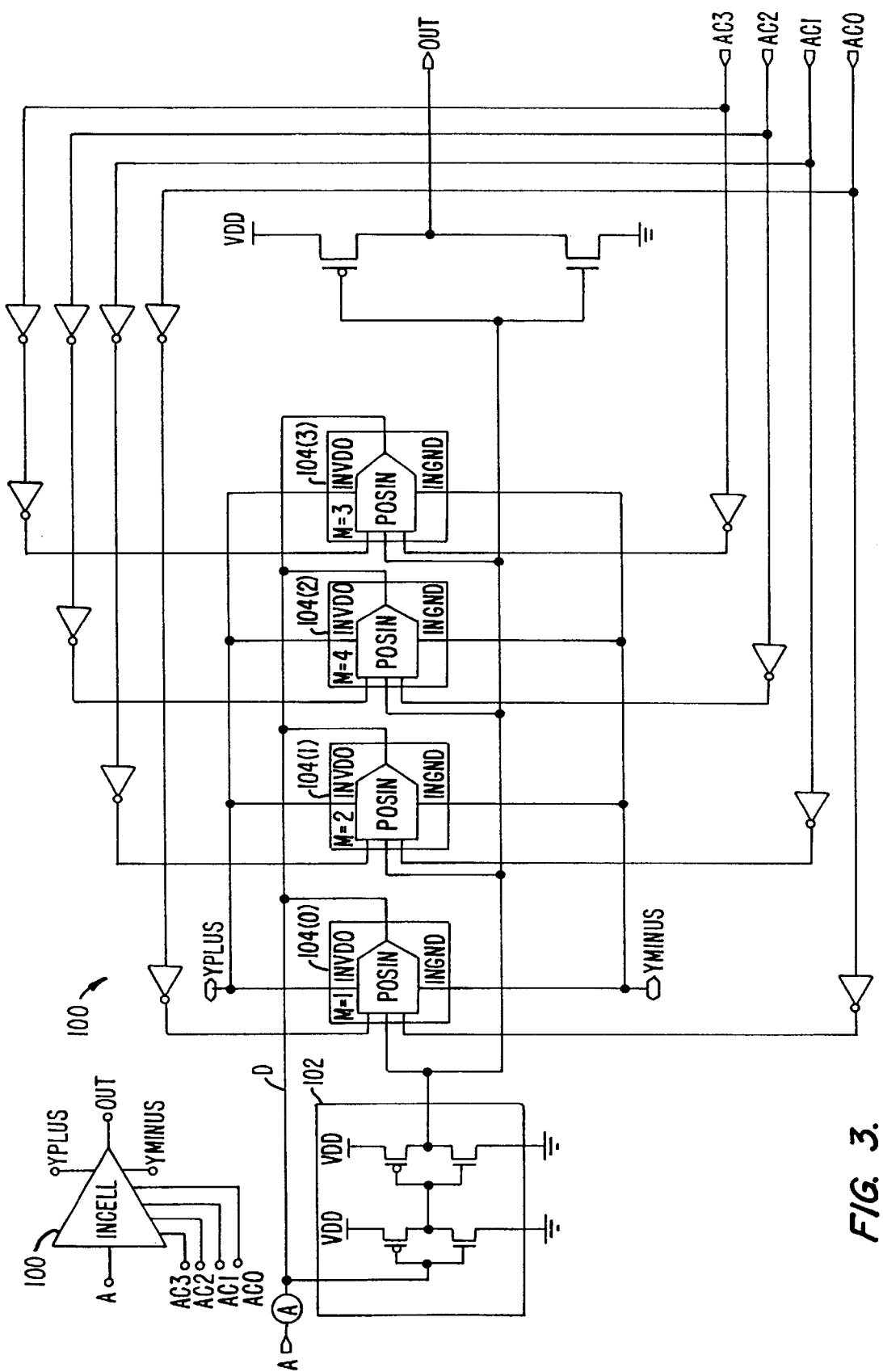
FIG. 3 is a schematic diagram of an input receiver circuit according to one embodiment of the present invention.

FIG. 3 is a schematic diagram of an input receiver circuit 100 according to one embodiment of the present invention. Such a circuit 100 is suitable for use on an integrated circuit (chip) at an input to the chip to match impedance with a driver sending a signal over a transmission line, such as a printed circuit board trace. In the upper left corner of FIG. 3, a symbolic representation of circuit 100 is shown, as might appear in a higher level schematic. As illustrated by the symbolic representation, circuit 100 has an input (A) and an output (OUT) and is coupled to power rails (VPLUS, VMINUS). Circuit 100 also has a plurality of control inputs for controlling the effective input impedance at input A (AC0, . . . , ACn). In this example, the number of control inputs is four, but other implementations might use more than four or as few as one control input. Increasing the POSIN units using the control inputs reduces the input impedance as seen from the driver, because the increase effectively increases the transistor size and this references the input impedance The input signal A is coupled to an inverter pair 102, which is a pair of serially connected inverters. The output of inverter pair 102 is coupled to the inputs of each of a plurality of controlled inverters 104, where each controlled inverter is controlled by one of the plurality of control inputs. The output of inverter pair 102 is also coupled to an output buffer, which provides the output for circuit 100. The output of each controlled inverter is coupled to the input A, to form the feedback loop.

When circuit 100 is configured as described above and shown in FIG. 3, there is a positive feedback loop at the input (a three-inverter loop). While a three-inverter loop might normally be expected to oscillate, the control inputs and the limits imposed on the transmitter prevent oscillation by keeping the open loop gain less than one. The control inputs are controlled by control lines and, as explained below, the settings of the control inputs determines the collective sourcing and sinking strength of the plurality of controlled inverters 104.

Figure 5:
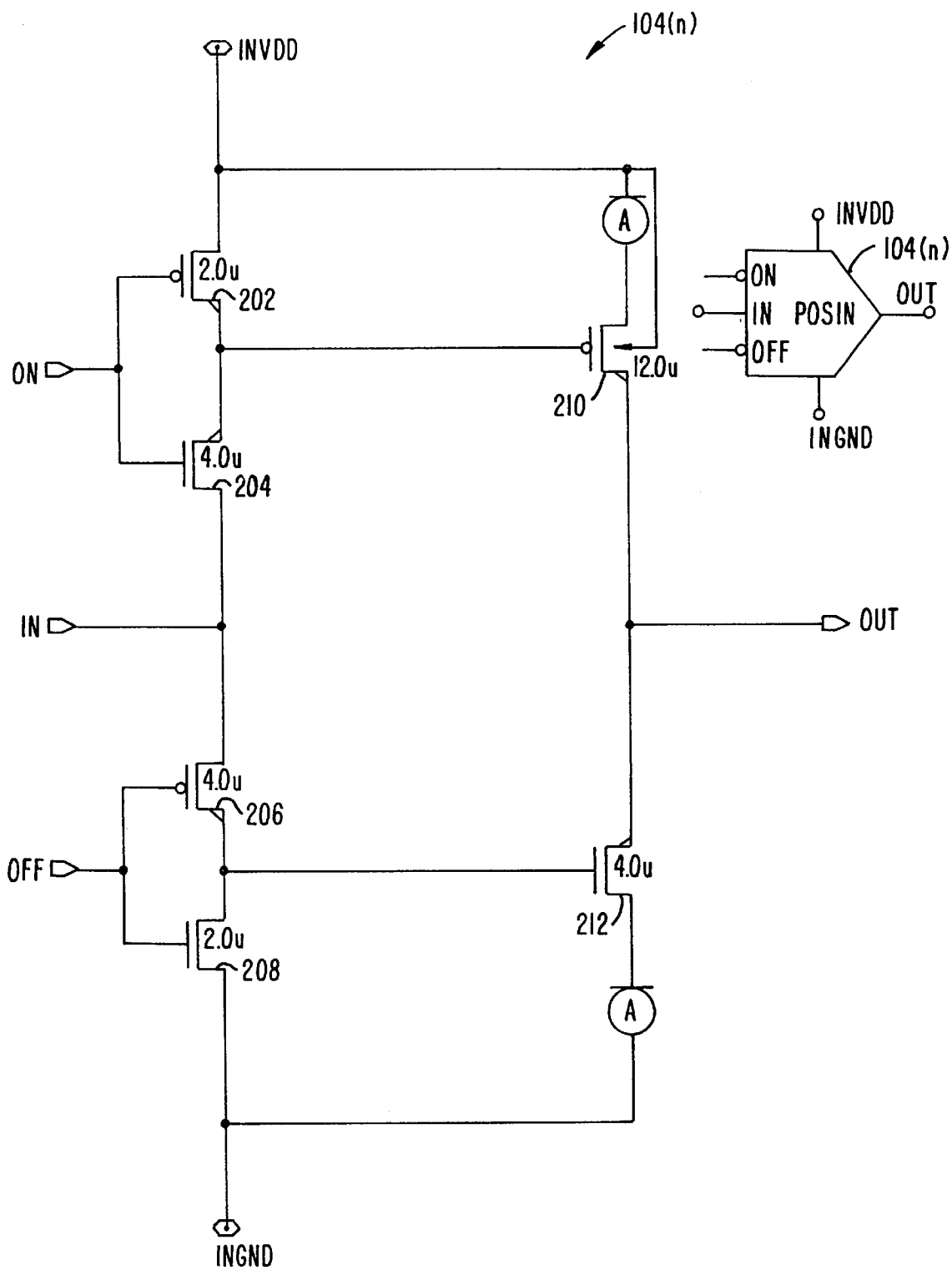
FIG. 5 is a schematic diagram showing one of the switchable inverting buffer elements of FIG. 3 in greater detail.

The control lines determine the receiver impedance by changing the effective strength of transistors 210, 212 (see FIG. 5). In the example of FIG. 3, there are four control lines (AC0, . . . , AC3) for four controlled inverters (104(0), . . . , 104(3)).

Figure 4:
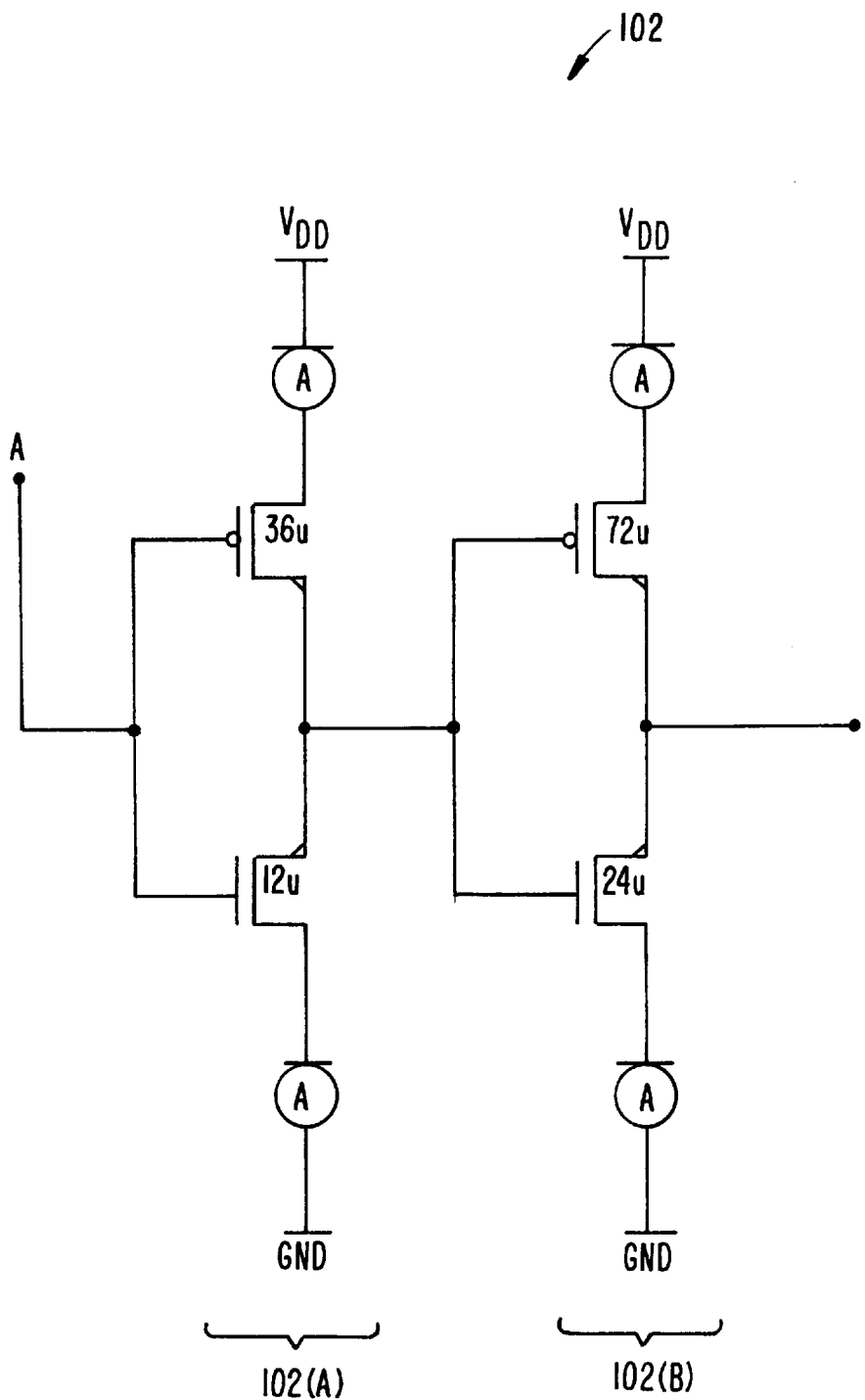
FIG. 4 is a schematic diagram showing the inverter pair of FIG. 3 in greater detail.

In operation, when the input signal at A is low, current is being drawn out of circuit 100 from node A. If sufficient current is drawn from A, the output of the first inverter 102(a) is high (see FIG. 4 for a more detailed view of inverter pair 102), forcing the input of the second inverter 102(b) high and its output low. This action turns on one or all of the controlled inverters 104, depending on the states of the control input for the controlled inverters. The action of the controlled inverters 104 and inverter pair 102 forces the OUT node high. If sufficient current is forced into node A (by the input being driven high), the opposite occurs and the output OUT will be forced low.

As shown in FIG. 3, each controlled inverter 104 has an ON input and an OFF input. The control line (ACn) for a controlled inverter 104(n) is coupled to the ON input of that controlled inverter through two inverters, while that control line is coupled to the OFF input of that controlled inverter through one inverter. In this example, each controlled inverter has a size that is double the size of controlled inverter to its left. This is achieved by using multiple inverters in parallel. In FIG. 3, M refers to the number of inverters used in parallel. Thus, controlled inverter 104(1) is double the size of controlled inverter 104(0). By controlling the control lines, the sourcing and sinking strength of the plurality of controlled inverters can be varied among sixteen different values.

FIG. 5 shows a controlled inverter 104 in greater detail. The circuit shown there is for M=1. As shown there, the ON input to controlled inverter 104 is coupled to a PMOS transistor 202 and an NMOS transistor 204, while the OFF input to controlled inverter 104 is coupled to a PMOS transistor 206 and an NMOS transistor 208. Those transistors are coupled in series between the positive rail (INVDD) and the negative rail (INGND) such that current would flow (if all transistors were on) from INVDD, through PMOS transistor 202, NMOS transistor 204, PMOS transistor 206, NMOS transistor 208 and to INGND. The input to controlled inverter 104 is coupled to the node between NMOS transistor 204 and PMOS transistor 206.

The node between PMOS transistor 202 and NMOS transistor 204 is coupled to an output PMOS transistor 210, while the node between PMOS transistor 206 and NMOS transistor 208 is coupled to an output NMOS transistor 212, so that a high level on the ON input couples the input to the gate of output PMOS transistor 210 through NMOS transistor 204 and a low level on the OFF input couples the input to the gate of output NMOS transistor 212 through PMOS transistor 206. When the ON input is low and the OFF input is high, the input is isolated from the output because both NMOS transistor 204 and PMOS transistor 206 are off. The output transistors 210, 212 are coupled in series from the positive rail to the negative rail, so they carry the input signal to the output of controlled inverter 104 when the ON input is high and the OFF input is low.

Using the input receiver circuit described herein, transition speed can be increased. One way to do that is by controlling the input termination impedance. The positive feedback, in effect, creates preemphasis.

In summary, a novel input receiver circuit has now been described. The foregoing description of preferred embodiments of the invention has been presented for the purposes of description. It is not intended to be exhaustive or to limit the invention to the precise form described, and modifications and variations are possible in light of the teaching above. For example, given the explanation above, it will be appreciated that input receiver circuits can be designed using the principles of this invention with controlled inverters other than the examples described herein.

What is claimed is:

1. An input receiver for an integrated circuit having a controllable impedance, comprising:
   an input buffer having an input for receiving an input signal and an output;
   a controlled impedance element having an input coupled to the output of the input buffer and an output coupled to the input of the input buffer, said controlled impedance element operable to cause an input impedance of the receiver to be substantially equal to an impedance of a driver providing the input signal, when the input signal is at a high level or at a low level, and a varying impedance, when the input signal is in transition from one level to another; and
   an output buffer having an input coupled to the output of the input buffer and an output coupled to the integrated circuit.

2. The input receiver of claim 1 wherein the controlled impedance element sources current to the input of the input buffer, during an input signal transition from a low level to a high level.

3. The input receiver of claim 1 wherein the controlled impedance element sinks current from the input of the input buffer, during an input signal transition from a high level to a low level.

4. An input receiver for an integrated circuit having a controllable impedance, comprising:
   an input buffer having an input for receiving a chip input signal and an output;
   a plurality of controlled impedance elements coupled in parallel such that each controlled impedance element has an input coupled to the output of the input buffer and an output coupled to the input of the input buffer, said plurality of controlled impedance elements operable to cause an input impedance of the receiver to be substantially equal to an impedance of a driver providing the input signal, when the chip input signal is at a high level or at a low level, and a varying impedance, when the chip input signal is in transition from one level to another; and
   an output buffer having an input coupled to the output of the input buffer and an output coupled to the integrated circuit.

5. The input receiver of claim 4 wherein each controlled impedance element comprises:
   an input for receiving an input signal;
   a control input operable to selectively couple the input signal to a pull-up transistor and to a pull down transistor; and
   an output for providing an output signal that is an inverse of the input signal.

6. The input receiver of claim 5 wherein each controlled impedance element comprises a controlled inverter having a pull-up and a pull-down transistor, the sizes of the pull-up and pull-down transistors of a given controlled inverter being larger than the sizes of the pull-up and pull-down transistors of a controlled inverter immediately preceding the given controlled inverter.

7. The input receiver of claim 6 wherein the sizes of the pullup and pull-down transistors of the given controlled inverter are approximately twice as large as the respective sizes of the pull-up and pull-down transistors of the controlled inverter immediately preceding the given controlled inverter.

* * * * *

UNITED STATES PATENT AND TRADEMARK OFFICE
CERTIFICATE OF CORRECTION

PATENT NO. : 6,384,642 B1
DATED : May 7, 2002
INVENTOR(S) : Bosnyak et al.

It is certified that error appears in the above-identified patent and that said Letters Patent is hereby corrected as shown below:

<u>Title page,</u>
Item [75], Inventors, after "Cruz", delete ";" and insert -- , Palo Alto; -- and after "Drost," insert -- Mountain View -- and delete "both of Palo Alto".

Signed and Sealed this

Twenty-first Day of January, 2003

JAMES E. ROGAN
*Director of the United States Patent and Trademark Office*